US007075925B1

(12) United States Patent
Van Tol

(10) Patent No.: US 7,075,925 B1
(45) Date of Patent: Jul. 11, 2006

(54) SYSTEM FOR COUPLING THE PUBLIC TELEPHONE NETWORK TO THE INTERNET

(75) Inventor: Alphonsus Johannes Van Tol, Za Alphen A/D Rijn (NL)

(73) Assignee: Koninklijke KPN N.V., The Hague (NL)

( * ) Notice: Subject to any disclaimer, the term of this patent is extended or adjusted under 35 U.S.C. 154(b) by 0 days.

(21) Appl. No.: 09/600,982

(22) PCT Filed: Feb. 3, 1999

(86) PCT No.: PCT/NL99/00054

§ 371 (c)(1),
(2), (4) Date: Sep. 14, 2000

(87) PCT Pub. No.: WO99/40710

PCT Pub. Date: Aug. 12, 1999

(30) Foreign Application Priority Data

Feb. 10, 1998 (NL) .................................... 1008259

(51) Int. Cl.
*H04I 12/66* (2006.01)
*H04M 7/00* (2006.01)

(52) U.S. Cl. .................................. 370/356; 379/221.12

(58) Field of Classification Search ........ 370/352–356, 370/367, 242–251, 395.31, 389, 390, 392–393, 370/400–410; 379/221.02, 221.09, 221.12, 379/221.14, 114.27–118

See application file for complete search history.

(56) References Cited

U.S. PATENT DOCUMENTS

| 5,442,620 | A | * | 8/1995 | Kremer ....................... 370/224 |
| 5,524,146 | A | * | 6/1996 | Morrisey et al. ...... 379/221.02 |
| 5,537,464 | A |   | 7/1996 | Lewis et al. ................. 379/114 |
| 6,084,875 | A | * | 7/2000 | Forrest ........................ 370/355 |

FOREIGN PATENT DOCUMENTS

| NL | 9201010 | 6/1992 |
| WO | WO 97/29584 | 8/1997 |

OTHER PUBLICATIONS

PTT Telecom BV, "Informatie" *Telefoongids*, 1997, pp. 1-2.
G.S. Hura, "The Internet: Global Information Superhighway for the Future" *Computer Communications*, vol. 20, No. 16, Jan. 1998, pp. 1412-1430.

* cited by examiner

*Primary Examiner*—Hanh Nguyen
*Assistant Examiner*—Thai Hoang
(74) *Attorney, Agent, or Firm*—Michaelson & Associates; Peter L. Michaelson

(57) ABSTRACT

System for coupling the public telephone network to the Internet in which a special number sequence is determined for the Internet Service Providers—ISP—and a specific number from the sequence is assigned to a specific ISP. For the Netherlands in particular a number sequence 067xxx can be used. From every telephone connection, a 067xxx-call can be led to an ISP across the shortest trajectory possible, which is to be judged by the network operator (NO). Per traffic exchange, one access to an ISP is established. All Internet traffic is led from the traffic exchange directly to the accompanying calling point of the ISP, in which the calling point can be coupled to an underlying number exchange as well.

10 Claims, 1 Drawing Sheet

SYSTEM FOR COUPLING THE PUBLIC TELEPHONE NETWORK TO THE INTERNET

BACKGROUND OF THE INVENTION 1.0 Field of the Invention

The invention relates to a method for connecting the public telephone network to the Internet, by dialing a number for obtaining a connection.

2.0 Description of the Related Art

Such a method is known from the publication: "Computer Communications" XP00413222. On page 1421—right column—it is remarked: "In the case of a dial-up lines, the number (usually assigned by the computer center for setting up the host) needs to be dialed for connection . . . "

So it is the Internet Service Provider—ISP—, who decides where its calling points—which can be indicated as POP'S: Points of Presence—can be positioned and who will take care for the installation of normal telephone-connections to these PoP's.

In case of the relatively small numbers of incall-connections, as in the early days of the Internet, the public telephone network—(PSTN: Public Switched Telephony Network)—could easily take care for obtaining the desired connection.

This known method, however, has caused serious problems for the public telephone network by the increased number of requested connections with the Internet.

From U.S. Pat. No. 5,537,464 it is known to use a special number sequence to obtain billing information. Obviously this concerns a totally different problem than obtaining a connection with the Internet.

For explanation of the usual system we refer to the enclosed FIG. 1 in which "nrc 1–4" represent the number telephone exchanges and vkc represent traffic telephone exchanges. The designation ISP was already explained above. Subscribers are connected to a number telephone exchange. There, the registration of the calls takes place, which forms the basis for invoicing. A number telephone exchange covers a limited area, in which the areas do not overlap. The traffic telephone exchanges are for connecting subscribers that are connected to different number telephone exchanges.

The dialing code is important for invoicing. A number area is a collection of adjacent telephone exchange areas all having the same dialing code. In the following, for the sake of simplicity, it has been assumed that a dialing code area only contains one telephone exchange area. For invoicing, one employs the term basic area. The basic area is the dialing code area of the user plus all immediately adjacent dialing code areas. With the diagram of FIG. 1, it can be assumed, that the area nrc1 is adjacent nrc2 and nrc4. A conversation between nrc3 and nrc4 will be seen as a conversation within the basic area and a conversation between nrc1 and nrc3 will be seen as a conversation outside the basic area. It is clear that a conversation between nrc3 and nrc4 will be more expensive for the network operator (NO) than a conversation between nrc1 and nrc3. However, this is tolerated. The user only looks at the distance "in a straight line" and for the NO, the shortage of income on the conversations between nrc3 and nrc4 is compensated by the extra profits coming from the conversations between nrc1 and nrc3.

However, the latter does not apply to Internet traffic. A calling point of an ISP in nrc3 is called from the areas nrc2, nrc3 and nrc4, but not from nrc1. For the latter, a different calling point has been arranged. In all, an ISP in the Netherlands needs 26 calling points for national coverage.

Such a system has a number of disadvantages:

a) the NO must provide services at a low rate, even if the traffic is handled as interlocal traffic;

b) Internet traffic in which the user and the ISP are connected to two different NOs involves much costs and little profits.

c) Internet traffic can not be distinguished from the other traffic, as a result of which the trend determination Can not be established directly from traffic measurements, which makes network planning for the NO more difficult;

d) Internet traffic is difficult to predict and in case of overload or failure of a calling location, a domino effect may occur, as will be explained further;

e) it is necessary to have a large number of calling points for obtaining national coverage, this also in the areas where little traffic is to be expected;

f) all calling points must have a number of their own and those numbers must he communicated to the users;

g) combining the common telephone costs and the Internet costs is very expensive and is therefore hardly applied.

The domino effect could arise as follows. A user in Almere can gain access to his ISP at a local rate in Lelystad, Amersfoort or Amsterdam.

Now if the calling point Lelystad can not be contacted as result of a failure, a number of users will contact Amersfoort and others will contact Amsterdam. There, this may give rise to difficulties, so that users from Amsterdam or Hoofddorp will contact Haarlem, for example. This causes an extra loading of the network between various telephone exchanges and extra loading at the calling points. This results in the so-called domino effect as a result of which the ISP may become inapproachable and congestion will arise in the telephone exchange.

SUMMARY OF THE INVENTION

The object of the invention is to remove the difficulties described above and to that end the invention provides for that a special number sequence is determined for the ISPs and that a specific number from the sequence is assigned to a specific ISP.

For the Netherlands in particular, a number sequence 067xxx can be contemplated.

A 067xxx-call can now be led to an ISP across the shortest trajectory possible, which is to be judged by the NO.

DETAILED DESCRIPTION OF THE INVENTION

Figure 1:
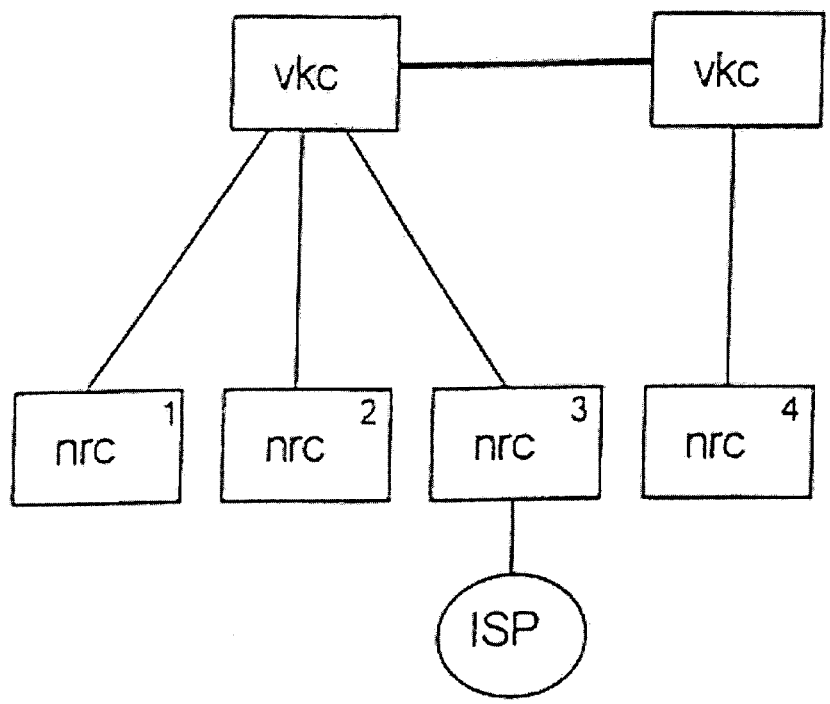
FIG. 1 depicts a diagram of a conventional system for coupling the public access telephone network to the Internet.
Figure 2:
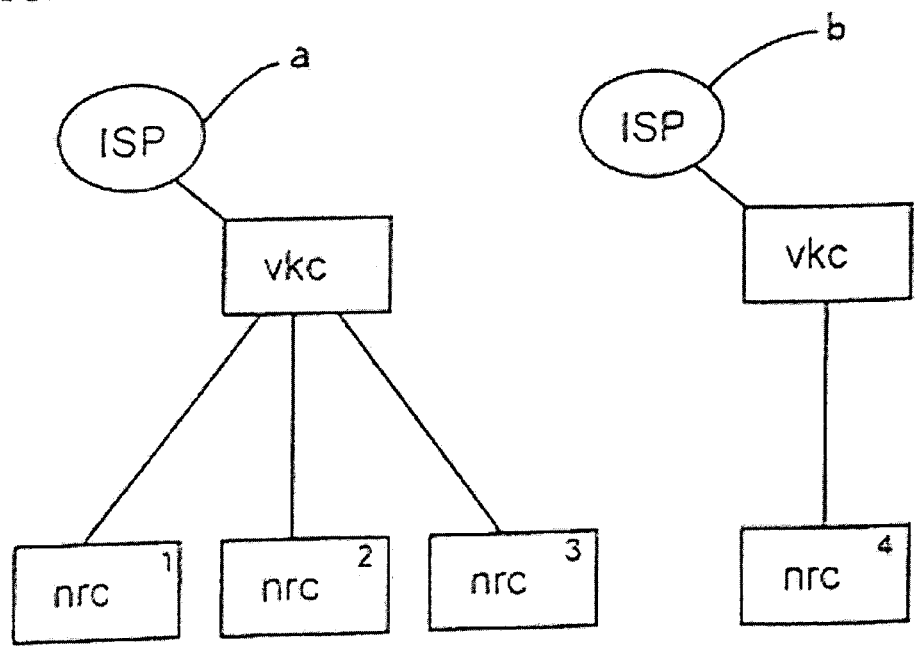
FIG. 2 depicts a diagram of the system according the invention.

In FIG. 2 the system according to the invention is indicated diagrammatically. The employed terms correspond, to the ones applied in FIG. 1 so that they need not be explained further. Per vkc, one access to an ISP is established. From the vkc, all Internet traffic is directly led to the calling point of the ISP, which calling point may also be coupled to an underlying number telephone exchange.

This provides great advantages for both parties. For the NO: for Internet traffic which was already within the same vkc-area, nothing will change. For traffic which in the existing situation is led from the one vkc to the other, one saves a telephone exchange passage and a connection in the network between the vkc's. For the ISP: the number of calling points can be reduced, e.g. from 26 to 20.

By using the specific number sequence, a calling point can always be contacted per vkc at a low rate. According to the present regulations in the Netherlands the sequence 067xxx is destined for "videotext and data services", so that according to the invention this sequence is most suitable for that purpose. The routing tables can now be set such, that in the areas nrc1, nrc2 and nrc3 the number 067xxx refers to ISP (a) and in the area nrc4 the same number refers to ISP (b). Invoicing this number is independent from the location of ISP (a) or ISP (b).

At the same time, with the system according to the invention, it is achieved that an ISP requires only one number which is valid nationwide. Thus, the Internet users need not remember various numbers for, e.g., at home and at the office. The system according to the invention has the additional advantage of a nationwide valid rate per ISP, with all Internet traffic now being easily recognizable, so that this can be taken into account on dimensioning the network.

The NO and ISP can make an arrangement on how to act in case of calamities, such as failure of a calling point. Users can no longer move directly to other calling points since they have no control over the choice of calling point. It would be possible to redirect the traffic in a controlled way behind the scenes. This can be done by both the No and the ISP.

On applying the invention, combining the costs of NO and ISP is possible in a simple way. However, NO can continue financially settling up the telephone traffic and ISP can continue financially settling up the use of Internet in the usual way. Another possibility is that NO makes the number available to the users free of charge and settles up with the ISP. For the NO, the advantage is in the reduction in invoice lines, a decreased collection risk and a better use of the network. For the ISP, it is possible to provide actual unlimited access to the Internet at a slightly higher rate. This further depends on the rates to be paid, for that matter.

In particular, for occasional users it can be advantageous that the NO bills both the telephone traffic and the use of Internet. For users who use the Internet for, e.g., only an hour per month, a subscription is relatively expensive so that an "open entry" is cheaper. Then one need not check in and subscribe in advance. At the moment, those users are of no interest for the ISP. They are anonymous and the costs of measuring and billing count for little compared to the returns.

It will be obvious that only one possible embodiment of a system according to the invention has been illustrated in the drawing and described above and that many changes can be made without leaving the inventive idea as it is indicated in the accompanying claims.

The invention claimed is:

1. A method for coupling a public telephone network to the Internet by dialing a number for obtaining a connection, the number being a predefined number sequence determined for Internet service providers with a specific number in the sequence being assigned to a specific Internet service provider (ISP), the public telephone network having first and second number telephone exchanges and first and second traffic telephone exchanges with the first and second traffic telephone exchanges being respectively connected to the first and second number telephone exchanges, and the first and second traffic telephone exchanges having first and second corresponding calling points respectively associated therewith for providing access to the specific ISP, the method comprising the steps of:
   setting a first routing table in the first number telephone exchange such that the specific number refers to the first calling point;
   setting a second routing table in the second number telephone exchange such that the specific number refers to the second calling point; and
   directing Internet traffic, via said the first and second number telephone exchanges and the first and second corresponding calling points, to the specific ISP.

2. The method according to claim 1 further comprising the step of invoicing the specific number independent of any calling point used.

3. The method according to claim 1 further comprising the step of re-directing Internet traffic from the first calling point to the second calling point.

4. The method according to claim 3 further comprising the step of invoicing the specific number independent of any calling point used.

5. The method according to claim 1 further comprising the step of using, for the Netherlands, 067xxx (where x represents any digit from 0–9), as the number sequence.

6. A system for use within a public telephone network to couple the network to the Internet, the network being capable of providing a connection to the Internet through dialing a number, the number being a predefined number sequence determined for Internet service providers with a specific number from the sequence being assigned to a specific Internet service provider (ISP), wherein the system comprises:
   first and second number telephone exchanges and first and second traffic telephone exchanges, the first and second traffic telephone exchanges being respectively connected to the first and second number telephone exchanges, and the first and second traffic telephone exchanges having first and second corresponding calling points respectively associated therewith for providing access to the specific ISP;
   a first routing table, associated with the first number telephone exchange, being set such that the specific number refers to the first calling point; and
   a second routing table, associated with the second number telephone exchange, being set such that the specific number refers to the second calling point; and
   wherein Internet traffic is directed, via said the first and second number telephone exchanges and the first and second corresponding calling points, to the specific ISP.

7. The system according to claim 6 wherein the specific number is invoiced independent of any calling point used.

8. The system according to claim 6 wherein Internet traffic can be re-directed from the first calling point to the second calling point.

9. The system according to claim 8 wherein the specific number is invoiced independent of any calling point used.

10. The system according to claim 6 wherein, for the Netherlands, 067xxx (where x represents any digit from 0–9) is used as the number sequence.

* * * * *